United States Patent [19]
Bell

[11] Patent Number: 5,785,163
[45] Date of Patent: Jul. 28, 1998

[54] CLUTCH COVER ASSEMBLY

[75] Inventor: Christopher A. Bell, Cuba, Mo.

[73] Assignee: Ace Manufacturing and Parts Co., Sullivan, Mo.

[21] Appl. No.: 664,240

[22] Filed: Jun. 7, 1996

[51] Int. Cl.$^6$ .......................... F16D 13/42; F16D 43/08
[52] U.S. Cl. .................. 192/70.3; 192/99 A; 192/105 C
[58] Field of Search .................. 192/105 C, 70.29, 192/70.3, 99 A

[56] References Cited

U.S. PATENT DOCUMENTS

| | | | |
|---|---|---|---|
| 2,107,954 | 2/1938 | Morton et al. | 192/105 C X |
| 2,111,721 | 3/1938 | Padgett | 192/105 C |
| 2,743,805 | 5/1956 | Lindberg et al. | |
| 3,334,716 | 8/1967 | Spokas . | |
| 3,580,372 | 5/1971 | Schiefer et al. | 192/99 A X |
| 4,298,112 | 11/1981 | Carstensen | 192/70.2 |
| 5,361,882 | 11/1994 | Tipton | 192/105 C X |
| 5,597,060 | 1/1997 | Huddleston et al. | 192/105 C |

OTHER PUBLICATIONS

Tom Monroe, "Clutch & Flywheel Handbook," revised edition 1991, p. A1-A2, 19-30, 40-54 and 175-181.

*Primary Examiner*—Rodney H. Bonck
*Attorney, Agent, or Firm*—Senniger, Powers, Leavitt & Roedel

[57] ABSTRACT

A centrifugal clutch cover assembly for use in a clutch as a reaction surface in selective actuation of a pressure ring to clamp one or more discs mounted on a drive shaft for conjoint rotation therewith between the pressure ring and a flywheel of an engine thereby to selectively interconnect the drive shaft and the engine flywheel. The cover assembly includes a flat cover plate having a center and a central opening therein for receiving the drive shaft therethrough free of connection to the cover plate. Lever assemblies include levers pivotally mounted on the clutch plate at angularly spaced apart locations, and pressure members constructed and arranged for applying a force to the pressure ring for clamping the disc between the pressure ring and flywheel. The levers are disposed such that the pressure members apply more clamping force to the pressure ring the faster the flywheel and cover plate are rotating. The cover assembly is connected to the flywheel at locations that are angularly spaced from the locations of the lever assemblies.

23 Claims, 4 Drawing Sheets

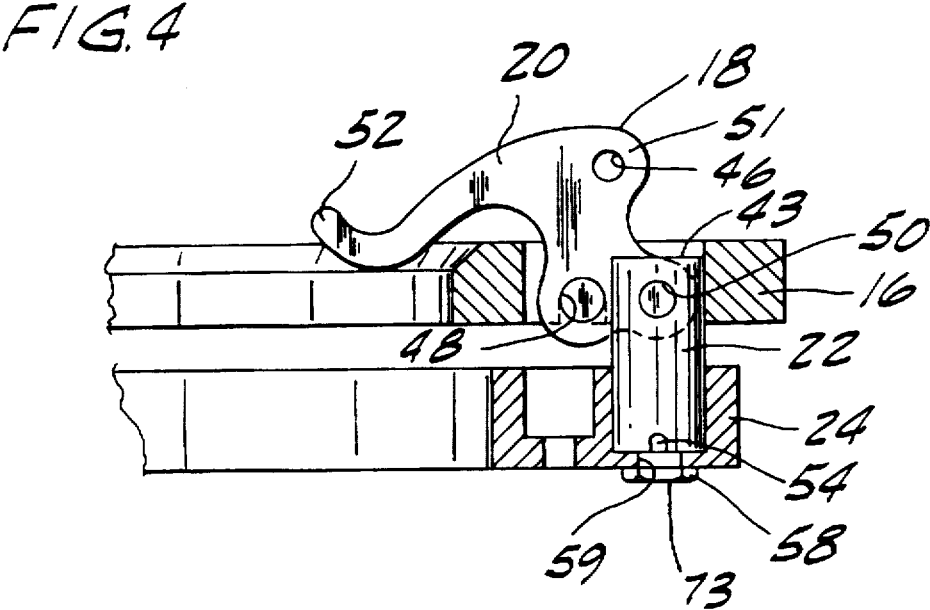
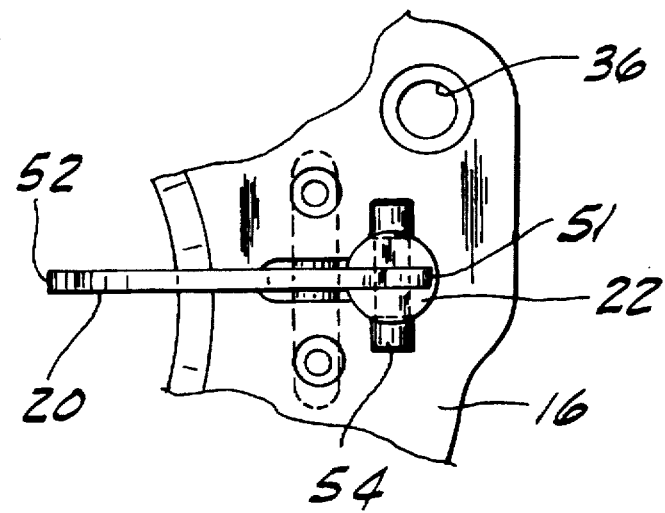

CLUTCH COVER ASSEMBLY

BACKGROUND OF THE INVENTION

This invention relates to clutches used in high performance vehicles such as racing cars. More specifically, this invention relates to clutch cover assemblies for use in centrifugal slider clutches.

As is well known, clutches for vehicles operate to selectively couple and decouple an engine to a drive shaft for the purpose of starting the engine while the vehicle is in gear, bringing the vehicle to a stop while the engine is running, changing gears while the vehicle is in motion and putting the vehicle in motion from a dead stop. Conventional clutches include a cover assembly having an annular cover plate and an annular pressure ring connected to the cover plate for conjoint rotation with the cover plate. The cover plate is fixedly attached to a flywheel driven by the vehicle engine, so that the pressure ring is located between the cover plate and the flywheel. Attachment of the cover plate to the flywheel is by a plurality of bolts which space the cover plate and pressure ring from the flywheel.

A drive shaft is received through the cover assembly and flywheel free of fixed connection to any of these so that absent action of the clutch, the drive shaft and flywheel rotate independently of each other. The drive shaft is splined and one or more friction discs are mounted on the splines for conjoint rotation with the drive shaft, while being free to slide longitudinally of the drive shaft. The friction discs are positioned between the pressure ring and the flywheel. Heat shields are disposed between the pressure ring and nearest friction disc, and also between the flywheel and nearest friction disc. Floater plates are disposed between adjacent friction discs.

Springs between the cover plate and pressure ring force the ring away from the cover plate to clamp the friction discs against the flywheel. This clamping action mates the drive shaft and flywheel for conjoint rotation so that the drive shaft is driven by the engine. However, some relative rotation or sliding between the friction discs and flywheel desirably occurs before there is conjoint rotation to reduce the impact loads on the engine and drive shaft as well as to make the motion of the vehicle smoother.

The clutch is released to permit independent rotation of the flywheel and drive shaft by a mechanical linkage. Levers pivotally mounted on the cover plate are connected to pins fixedly attached to the pressure ring. The levers may be engaged by a release member of the mechanical linkage to pull the pressure ring toward the cover plate against the force of the springs to release the clutch. However in a centrifugal clutch, the levers may also be used to assist the pressure ring in applying a clamping force to the friction discs. More specifically, the levers are positioned so that when they are free of engagement with the release member the rotation of the cover plate with the flywheel causes the levers to pivot outwardly (because of centrifugal force) in a direction opposite the direction they are pivoted to release the clutch. As a result, the pins connecting the pressure ring to the cover plate drive the pressure ring outwardly from the cover plate, augmenting the clamping force of the springs. It is readily understood that the augmentation supplied by the action of the levers is greater the faster the flywheel is rotating.

In a centrifugal clutch, the cover plate must endure substantial reaction forces applied through the lever pins. For this reason the bolts connecting the cover plate to the flywheel are connected to the cover plate radially outwardly of and immediately adjacent to the lever pins. However, the cover plate must also withstand substantial reaction forces applied by the springs to the cover plate. The connecting bolts are spaced farther away from the springs than the lever pins, and the cover plate is subjected to large bending forces which tend to deflect the plate. Continuous deflection of the cover plate results in free play between the cover and flywheel connection, which reduces the overall efficiency of the clutch. Conventionally, the cover plate is strengthened by making it of steel and sizing it large enough to resist the bending forces. However, in time the cover plate tends to fail as a result of the reaction forces. It has been found that most of the deflection occurs adjacent to the springs. Moreover, the large size and weight of the cover plate undesirably increases its inertia.

SUMMARY OF THE INVENTION

Among the several objects and features of this invention may be noted the provision of a clutch cover assembly that reduces deflection of the cover plate caused by loads transmitted at connection points of the cover plate to a flywheel and levers which exert force for engagement of the clutch; the provision of such a clutch cover assembly which has a long life; the provision of such a clutch cover assembly that is lightweight thus providing lower inertia; the provision of such a clutch cover assembly that is compact while providing sufficient clamping forces; the provision of such a clutch cover assembly which has a mean effective radius which is nearer its overall radius; and the provision of such a clutch cover assembly that provides improved reliability and reduced clutch maintenance.

Generally, a centrifugal clutch cover assembly of this invention is for use in a clutch as a reaction surface in selective actuation of a pressure ring to clamp disc means mounted on a drive shaft for conjoint rotation therewith between the pressure ring and a flywheel of an engine thereby to selectively interconnect the drive shaft and the engine flywheel. The cover assembly includes a flat cover plate having a center and a central opening therein for receiving the drive shaft therethrough free of connection to the cover plate. The cover assembly further includes lever assemblies having levers pivotally mounted on the clutch plate at angularly spaced apart locations and pressure members constructed and arranged for applying a force to the pressure ring for clamping the disc means between the pressure ring and flywheel. The levers are operatively connected to the pressure members such that the pressure members apply more clamping force to the pressure ring the faster the flywheel and cover plate are rotating. Multiple means are provided for connecting the cover assembly to the flywheel and are disposed at angularly spaced apart locations around the center of the cover plate. The location of each connecting means is angularly spaced from the locations of the lever assemblies.

Other objects and features will be in part apparent and in part pointed out hereinafter.

BRIEF DESCRIPTION OF THE FIGURES

FIG. 4 is a partial cross-sectional view of a lever connecting the cover plate to a pressure ring of the clutch cover assembly of FIG. 1;

FIG. 5 is a top plan view of the lever and cover plate of FIG. 4; and

Corresponding parts are designated by corresponding reference numerals in the several views of the drawings.

DESCRIPTION OF THE PREFERRED EMBODIMENT

Figure 1:
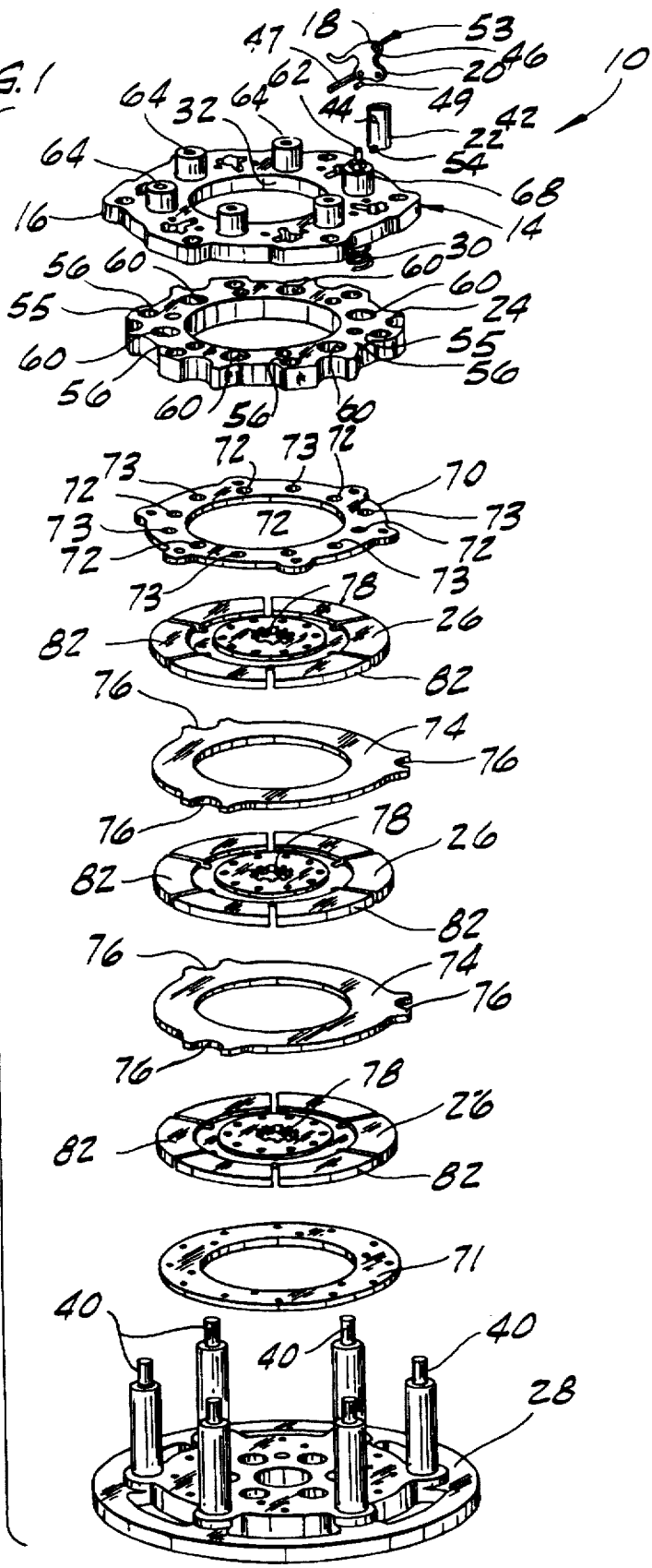
FIG. 1 is an exploded perspective view of a clutch having a clutch cover assembly of this invention.

Referring now to the drawings, and first to FIG. 1, there is a clutch of the present invention, generally indicated at 10, for coupling and decoupling a drive shaft 12 to an engine (not shown). The clutch 10 includes a clutch cover assembly, generally indicated at 14, having a cover plate 16, a pressure ring 24 and lever assemblies 18 mounted on the cover plate. The lever assemblies 18 include levers 20 mounting pressure pins 22 connected to the pressure ring 24 and capable of applying force to the pressure ring for clamping friction discs 26 between the pressure ring and a flywheel driven 28 by the engine through a coupling 29. Springs 30 between the cover plate 16 and pressure ring 24 bias the pressure ring into clamping engagement with the discs 26. Only one spring 30 is shown in FIG. 1 for clarity of the illustration, there being a total of six spaced apart springs in the preferred embodiment. The cover plate 16 is fixedly connected to the flywheel 28 and the discs 26 are connected to the drive shaft 12 (FIG. 6) as in conventional clutch designs. The cover plate 16 is used to release spring clamping forces and as a reaction surface for the pressure ring 24 to clamp the discs 26 mounted on the drive shaft 12 for conjoint rotation with the drive shaft between the pressure ring and the flywheel 28 thereby to selectively interconnect the drive shaft and the engine flywheel.

Figure 2:
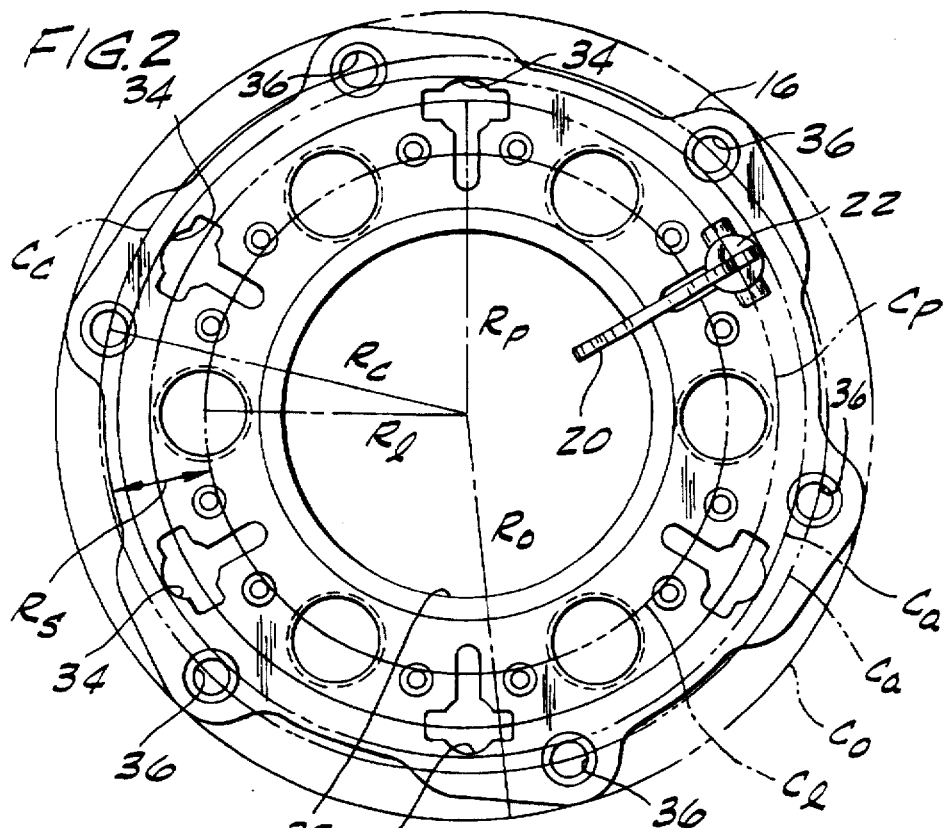
FIG. 2 is a top plan view of a cover plate of the clutch cover assembly shown in FIG. 1.
Figure 3:
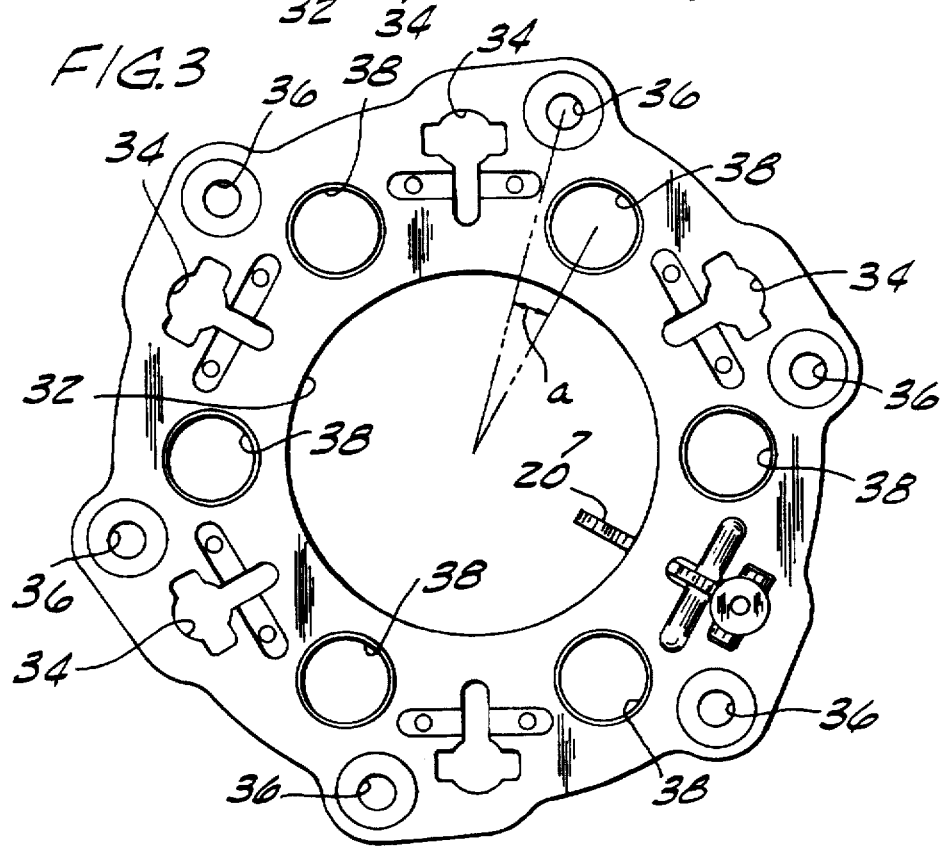
FIG. 3 is a bottom plan view of the cover plate of FIG. 2.
Figure 6:
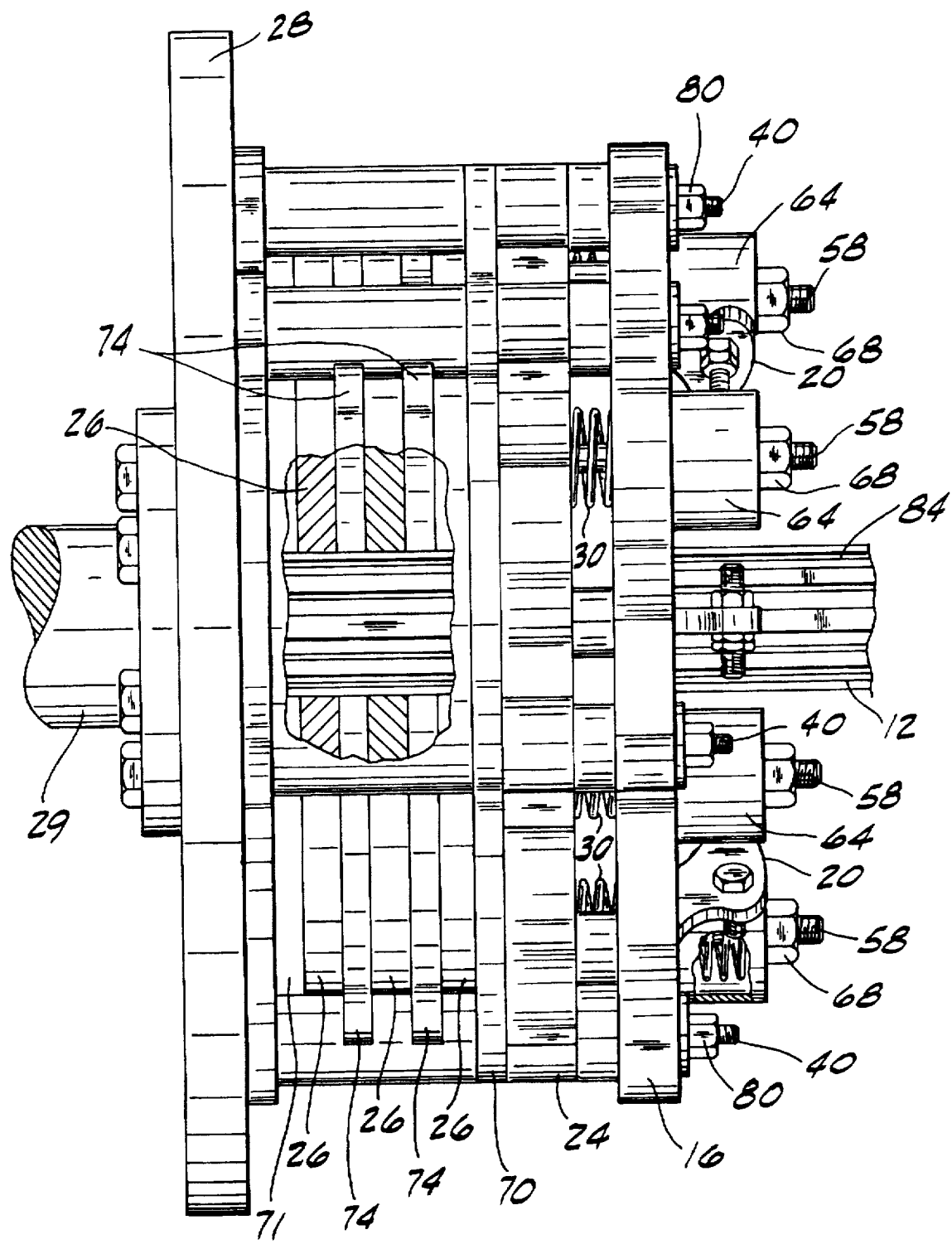
FIG. 6 is a side view of the assembled clutch of FIG. 1.

The cover plate 16 is generally flat and has a center C and a central opening 32 therein for receiving the drive shaft 12 therethrough free of connection to the cover plate (FIGS. 2, 3 and 6). The cover plate 16 is preferably made from a lightweight aluminum or titanium forging and is approximately 0.56 inches thick. It is to be understood that other suitable high strength to weight ratio materials may be used, such as those used in the aerospace industry. The cover plate 16 includes six openings 34 shaped for receiving the levers 20 and pressure pins 22 such that the pressure pins have centers lying generally on a circle $C_p$ concentric with the center of the cover plate and having a radius $R_p$. The plate 16 further includes six openings 36 (broadly, "connecting means") for receiving connecting bolts 40 for fixedly connecting the cover plate to the flywheel 28. The openings 36 have centers lying generally on a circle $C_c$ concentric with the center of the cover plate 16 and having a radius $R_c$. It is to be understood that the connecting means 36 could also comprise bolts or other structure used to connect the cover plate to the flywheel.

A third series of six holes 38 is provided in the cover plate 16 for locating the springs 30 engageable with the pressure ring 24 to bias the pressure ring into clamping engagement with the discs 26. The openings 38 for the springs 30 have centers located at angularly spaced apart locations disposed generally between the angular location of one of the pressure pins 22 and the angular location of an adjacent one of the connecting holes 36 (FIG. 3). The openings 38 have centers lying generally on a circle $C_l$ concentric with the center of the cover plate 16 and having a radius $R_l$. Preferably, the ratio of $R_l$ (centers of springs 30) to the radius $R_c$ (centers of connecting bolts 40) is greater than about 0.70. In the illustrated embodiment, $R_p$=3.6", $R_c$=4.081", $R_l$=3.0" and the ratio $R_l/R_c$=0.74. Furthermore, the openings 36 for the connecting bolts 40 and openings 38 for the springs 30 are arranged such that the radial spacing RS between circle $C_c$ on which the centers of the openings 36 lie and circle $C_l$ on which the centers of the locating holes 38 lie, normalized by $R_c$ is less than 0.28. In the illustrated embodiment RS=1.081" and RS/$R_c$=0.26.

In order to reduce deflection of the cover plate 16 caused by loading of the cover plate between the levers 20 and the connecting bolts 40, the openings 36 for the connecting bolts 40 are angularly spaced from the locations of the levers 20. By locating the connecting bolts 40 adjacent to the levers 20 rather than radially behind the levers, the connecting bolt holes 36 are closer to the spring bolt holes 38, thus reducing the deflection of the cover plate 16 due to reaction forces. The angular spacing $\alpha$ between the center of each of the openings 36 and the center of the nearest locating means 38 is less than 180° divided by twice the total number of the locating means on the cover plate and preferably less than 30°. The ratio of radius $R_p$ (centers of pressure pins 20) to radius $R_c$ (centers of connecting bolts) is preferably greater than 0.85 and is about 0.88 in the illustrated embodiment.

Furthermore, the radially innermost points on each of the openings 36 for receiving the connecting bolts 40 and the radially outermost points of the holes 34 for receiving the levers 20, lie substantially on a circle $C_a$ concentric with the center of the cover plate. This compact arrangement locates the openings 36 for the connecting bolts 40 closer to the center C of the cover plate 16, thus reducing the distance between the connecting bolts 40 and the overall diameter of the cover plate. The radially outermost points of the cover plate lie on a circle $C_o$ concentric with the center of the cover plate and having a radius $R_o$ (approximately 4.708"). The ratio of $R_p$ (center of openings 34 for pressure pins 22) to $R_o$ is preferably greater than 0.74 and is about 0.76 in the illustrated embodiment. The deflection of the cover plate 16 is thus reduced by decreasing the distance between adjacent connecting bolts 40 and the radial distance from the center of the cover plate to the connecting bolts. Furthermore, the smaller cover assembly 14 is lighter weight than conventional clutch cover assemblies thus reducing the inertia of the cover plate assembly. Moreover, the mean effective radius of the clutch is not changed even though the connecting bolts 40 are closer to the center C of the cover plate 16.

The pressure pins 22 are constructed and arranged to apply force to the pressure ring 24 for clamping the discs 26 between the pressure ring and flywheel 28 (FIG. 5). Each pressure pin 22 is cylindrical shaped and has a vertical slot 42 extending from the top side 43 of the pressure pin down to almost the center of the pressure pin and sized to receive the forward end 45 of the lever (FIG. 4). An axial opening 44 is provided in the end of the pressure pin 22 for insertion of a attachment pin 49 to connect the pressure pin and lever 20. The levers 20 are disposed such that the pressure pins 22 apply more clamping force to the pressure ring 24 the faster the flywheel 28 and cover plate 16 are rotating. As the speed of rotation of the cover plate 16 increases, the inertia of the levers 20 forces the radially inner end 52 of the levers 20 to lift upward thus imparting a downward force to the pressure pins 22 which in turn force the pressure ring 24 and subsequently the discs 26 into tighter clamping engagement with the flywheel 28. As shown in FIGS. 4 and 5, each lever 20 includes an opening 46 on the upper portion of the outer end 51 for mounting adjustable centrifugal weights 53. The amount of weight 53 (FIG. 1) added to the lever determines the amount of centrifugal force applied to the pressure ring 24 by operation of the lever 20 at a given rate of rotation of the cover plate 16. The lever 20 further includes two openings on the lower portion of the outer end 51 of the lever. The radially outermost opening 50 is used to connect the lever 20 to the pressure pin 22 (by way of the attachment pin 49). The innermost opening 48 on the lower portion of the lever 20 receives a pivot pin 47 to connect the lever to the cover plate 16 and is the point about which the lever pivots with respect to the cover plate.

Each lever 20 has a hook-shaped inner end 52 which extends into the central opening 32 of the cover plate 16. The inner end 52 is engageable with a conventional clutch actuator (not shown) for manual disengagement of the clutch 10 by applying pressure to a clutch pedal (not shown) which is connected to the actuator through a linkage (not shown). Upon application of pressure to the clutch pedal, the inner ends 52 of the levers 20 are forced downward, causing the outer end 51 of the levers to pivot counterclockwise (as shown in FIG. 4) and pull the pressure pins 22 and attached pressure ring 24 upward, thereby compressing the springs 30 interposed between the cover plate 16 and pressure ring 24 resulting in disengagement of the clutch. The connection of the pressure pin 22 to the pressure ring 24 is shown in FIG. 4. Each pressure pin 22 includes a tab 54 corresponding to a notch 56 extending outward from each opening 55 in the pressure ring 24. The tab 54 prevents rotation of the pressure pin 22 within the opening 55 in the pressure ring 24. The openings 55 in the pressure ring 24 for the pressure pins 22 each have a hole 59 for receiving an attachment bolt 58 to secure the pressure pin 22 to the pressure ring 24.

Referring again to FIG. 1, a second set of six openings 60 are provided in the pressure ring for receiving the springs 30 interposed between the pressure ring 24 and the cover plate 16. The locating means 38 comprises cups 64 on the cover plate 16 to locate and protect the springs 30. It is to be understood that the locating means 38 could also comprise a bolt, sleeve or other structure to support and center the spring 30 or other device used to force the pressure ring 24 into engagement with the adjacent disc 26. The cups 64 are integrally connected to the cover plate 16. The cups 64 each have a stud 62, which is threaded into a sleeve (not shown) and retained by a nut 68. A washer (not shown) is interposed between the sleeve and spring 30 to hold the spring against the pressure ring 24 and force the pressure ring into engagement with the disc 26. The nut 68 is used to vary the compressive force applied to the pressure ring 24 by varying the free length of the spring 30 through adjustment of the location of the washer. The pressure ring 24 is preferably made from cast iron or forged aluminum. It is to be understood that other suitable high strength to weight ratio materials may be used, such as those used in the aerospace industry. A heat shield 70 is connected to the bottom surface of the pressure ring 24 and acts as a friction surface for the adjacent disc 26. The heat shield 70 includes openings 72 extending partially through the heat shield for receiving bolt heads 75 extending from the bottom of the pressure ring 24. The heat shield further includes openings 73 for receiving bolts (not shown) for attaching the heat 70 shield to the pressure ring 24.

As shown in FIGS. 1 and 5, the clutch 10 of the illustrated embodiment includes three discs 26, however one or more disc may be used without departing from the scope of the invention. The addition of discs 26 increases the torque capacity of the clutch 10. A floater plate 74 is provided in between each set of discs 26. The floater plates 74 include U-shaped notches 76 around their outer periphery. The notches 76 are shaped for receiving the connecting bolts 40, which drive the floater plates 74 conjointly with the flywheel 28. The floater plates 74 are free to move longitudinally along a center axis of the clutch 10 in the same way as the discs 26 are free to move. Each disc 26 has two friction surfaces 82 and an internal spline 78 for connection with an external spline 84 of the drive shaft 12.

The discs 26 are arranged for indirect engagement with the flywheel 28 which is driven by the engine. The connecting bolts 40 extend from the flywheel 28 and into the six aligned openings 36 on the cover plate 16. Nuts 68 are used to securely attach the cover plate 16 to the connecting bolts 40, thus providing a rigid connection between the flywheel 28 and cover plate 16. A second heat shield 79 is attached by bolts (not shown) to the flywheel 28 to provide a friction surface for the disc 26 closest to the flywheel.

It will be observed from the foregoing that the clutch cover assembly 14 of this invention has numerous advantages. The illustrated configuration provides for a compact arrangement and minimizes the loading between attachment points of the cover plate 16 to the springs 30, levers 20 and flywheel 28, thus reducing deflection of the cover plate 16 and increasing the life of the clutch 10. The arrangement further provides for a smaller cover plate assembly 14 which reduces the inertia of the clutch 10 and increases the overall efficiency of the clutch.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A centrifugal clutch cover assembly for use in a clutch as a reaction surface in selective actuation of a pressure ring to clamp a disc mounted on a drive shaft for conjoint rotation therewith between the pressure ring and a flywheel of an engine thereby to selectively interconnect the drive shaft and the engine flywheel, the clutch cover assembly comprising a flat cover plate having a center and a central opening therein for receiving the drive shaft therethrough free of connection to the cover plate, lever assemblies including levers pivotally mounted on the cover plate at angularly spaced apart locations and pressure members constructed and arranged for applying a force to the pressure ring for clamping the disc between the pressure ring and flywheel, the levers being operatively connected to the pressure members such that the pressure members apply more clamping force to the pressure ring the faster the flywheel and cover plate are rotating, multiple means for connecting the clutch cover assembly to the flywheel, said multiple connecting means being disposed at angularly spaced apart locations around the center of the cover plate, the location of each connecting means being angularly spaced from the locations of the lever assemblies.

2. A cover assembly as set forth in claim 1 further comprising plural means for locating springs with respect to the cover plate, the springs being engageable with the pressure ring to bias the pressure ring into clamping engagement with the disc, said plural locating means having centers located at angularly spaced apart locations around the center of the cover plate, the center of each of said multiple connecting means being disposed at an angular location generally between the angular location of the center of an adjacent one of the pressure members and the angular location of the center of an adjacent one of said plural locating means.

3. A cover assembly as set forth in claim 2 wherein the angular spacing between the center of each of said connecting means and the center of the nearest of said plural locating means is less than 180° divided by twice the number of said plural locating means.

4. A cover assembly as set forth in claim 2 wherein the angular spacing between the center of each of said connecting means and the center of the nearest of said plural locating means is less than 30°.

5. A cover assembly as set forth in claim 2 wherein the cover plate is located above the pressure ring and each of said plural locating means comprises a downwardly opening cup sized for receiving a portion of one of the locating springs.

6. A cover assembly as set forth in claim 2 wherein said multiple connecting means have centers lying generally on a circle concentric with the center of the cover plate and having a radius $R_c$, and said plural locating means having centers located on a circle concentric with the center of the cover plate and having a radius $R_l$, the ratio of the radius $R_l$ of the circle on which the centers of said plural locating means lie to the radius $R_c$ of the circle on which the centers of said connecting means lie being greater than 0.70.

7. A cover assembly as set forth in claim 2 wherein said multiple connecting means have centers lying generally on a circle concentric with the center of the cover plate and having a radius $R_c$, and said plural locating means having centers located on a circle concentric with the center of the cover plate and having a radius $R_l$, the radial spacing between the circle on which the centers of said connecting means lie and the circle on which the centers of said plural locating means lie is RS, and wherein RS divided by $R_c$ is less than 0.28.

8. A cover assembly as set forth in claim 2 wherein the cover plate further comprises first holes therein receiving the pressure members, and wherein said multiple connecting means comprises a plurality of second holes in the cover plate for receiving connecting bolts of the flywheel therethrough, the radially innermost points on each of the second holes and the radially outermost point of the first holes lying substantially on a circle concentric with the center of the cover plate.

9. A cover assembly as set forth in claim 2 wherein the pressure members of the lever assemblies have centers lying generally on a circle concentric with the center of the cover plate and having a radius $R_p$, said multiple connecting means having centers lying generally on a circle concentric with the center of the cover plate and having a radius $R_c$, the ratio of $R_p$ to $R_c$ being greater than 0.85.

10. A cover assembly as set forth in claim 9 wherein the radially outermost points of the cover plate lie on a circle concentric with the center of the cover plate and having a radius $R_o$, the ratio of $R_p$ to $R_o$ being greater than 0.74.

11. A cover assembly as set forth in claim 2 wherein only one connecting means is located between two adjacent pressure members.

12. A cover assembly as set forth in claim 1 wherein the cover plate further comprises first holes therein receiving the pressure members, and wherein said multiple connecting means comprises a plurality of second holes in the cover plate for receiving connecting bolts of the flywheel therethrough, the radially innermost points on each of the second holes and the radially outermost point of the first holes lying substantially on a circle concentric with the center of the cover plate.

13. A cover assembly as set forth in claim 1 wherein the pressure members of the lever assemblies have centers lying generally on a circle concentric with the center of the cover plate and having a radius $R_p$, said multiple connecting means having centers lying generally on a circle concentric with the center of the cover plate and having a radius $R_c$, the ratio of $R_p$ to $R_c$ being greater than 0.85.

14. A cover assembly as set forth in claim 1 wherein the pressure members of the lever assemblies have centers lying generally on a circle concentric with the center of the cover plate and having a radius $R_p$, the radially outermost points of the cover plate lying on a circle concentric with the center of the cover plate and having a radius $R_o$, the ratio of $R_p$ to $R_o$ being greater than 0.74.

15. A clutch for selectively connecting and disconnecting a drive shaft to a flywheel of an engine, the clutch, comprising:

a friction disc adapted for mounting on the drive shaft for conjoint rotation therewith;

a pressure ring for applying a clamping force to the disc for clamping the disc between the pressure ring and flywheel to connect the flywheel to the drive shaft; and a clutch cover assembly comprising a flat cover plate having a center and a central opening therein for receiving the drive shaft therethrough free of connection to the cover plate, lever assemblies including levers pivotally mounted on the cover plate at angularly spaced apart locations and pressure members constructed and arranged for applying a force to the pressure ring for clamping the disc between the pressure ring and flywheel, the levers being operatively connected to the pressure members such that the pressure members apply more clamping force to the pressure ring the faster the flywheel and cover plate are rotating, multiple means for connecting the cover assembly to the flywheel, said multiple connecting means being disposed at angularly spaced apart locations around the center of the cover plate, the location of each connecting means being angularly spaced prom the locations of the lever assemblies.

16. A clutch as set forth in claim 15 further comprising plural means for locating springs with respect to the cover plate, the springs being engageable with the pressure ring to bias the pressure ring into clamping engagement with the disc, said plural locating means having centers located at angularly spaced apart locations around the center of the cover plate, the center of each of said multiple connecting means being disposed at an angular location generally between the angular location of the center of an adjacent one of the pressure members and the angular location of the center of an adjacent one of said plural locating means.

17. A clutch as set forth in claim 16 wherein the angular spacing between the center of each of said connecting means and the center of the nearest of said plural locating means is less than 180° divided by twice the number of said plural locating means.

18. A clutch as set forth in claim 16 wherein said multiple connecting means have centers lying generally on a circle concentric with the center of the cover plate and having a radius $R_c$, and said plural locating means having centers located on a circle concentric with the center of the cover plate and having a radius $R_l$, the ratio of the radius $R_l$ of the circle on which the centers of said plural locating means lie to the radius $R_c$ of the circle on which the centers of said connecting means lie being greater than 0.70.

19. A clutch as set forth in claim 16 wherein said multiple connecting means have centers lying generally on a circle concentric with the center of the cover plate and having a radius $R_c$, and said plural locating means having centers located on a circle concentric with the center of the cover plate and, having a radius $R_l$, the radial spacing between the circle on which the centers of said connecting means lie and the circle on which the centers of said plural locating means lie is RS, and wherein RS divided by $R_c$ is less than 0.28.

20. A clutch as set forth in claim 16 wherein the cover plate further comprises first holes therein receiving the pressure members, and wherein said multiple connecting means comprises a plurality of second holes in the cover plate for receiving connecting bolts of the flywheel therethrough, the radially innermost points on each of the second holes and the radially outermost point of the first holes lying substantially on a circle concentric with the center of the cover plate.

21. A clutch as set forth in claim 16 wherein the pressure members of the lever assemblies have centers lying generally on a circle concentric with the center of the cover plate and having a radius $R_p$, said multiple connecting means having centers lying generally on a circle concentric with the center of the cover plate and having a radius $R_c$, the ratio of $R_p$ to $R_c$ being greater than 0.85.

22. A clutch as set forth in claim 16 wherein the pressure members of the lever assemblies have centers lying generally on a circle concentric with the center of the cover plate and having a radius $R_p$, the radially outermost points of the cover plate lying on a circle concentric with the center of the cover plate and having a radius $R_o$, the ratio of $R_p$ to $R_o$ being greater than 0.74.

23. A clutch as set forth in claim 16 wherein only one connecting means is located between two adjacent pressure members.

* * * * *